O. C. BERCHTOLD.
KITCHEN UTENSIL.
APPLICATION FILED JAN. 8, 1910.
976,979.
Patented Nov. 29, 1910.
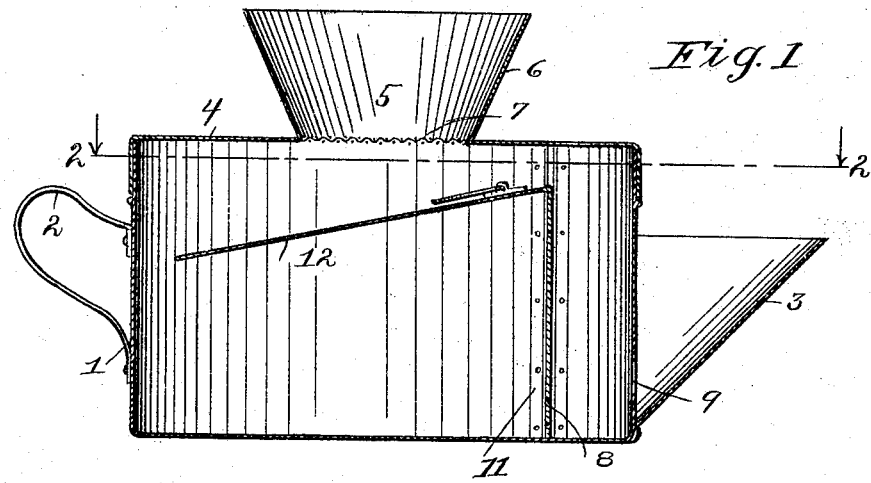
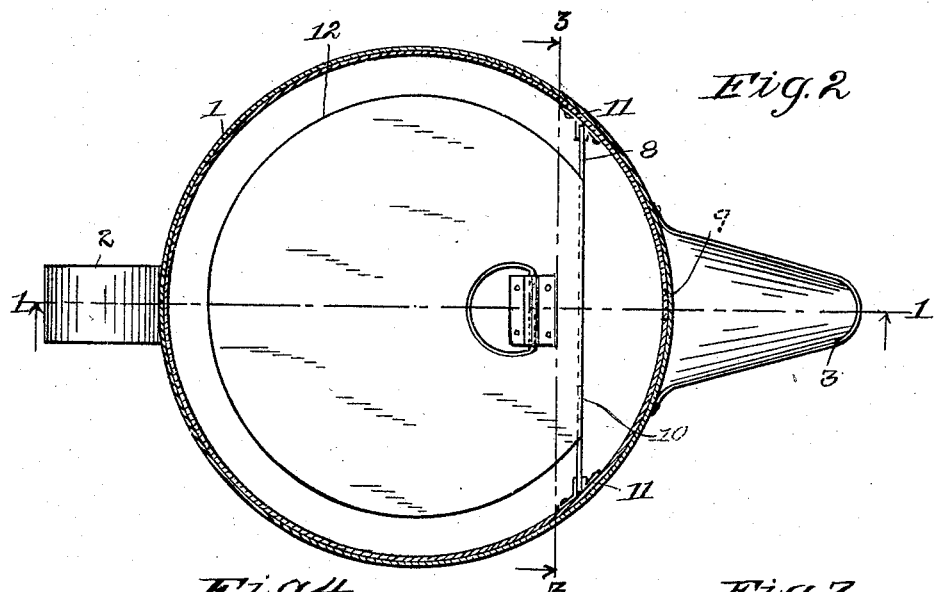
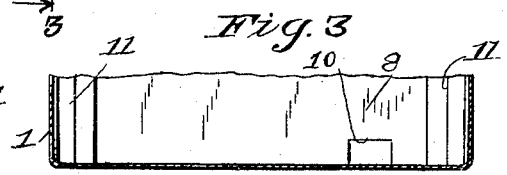
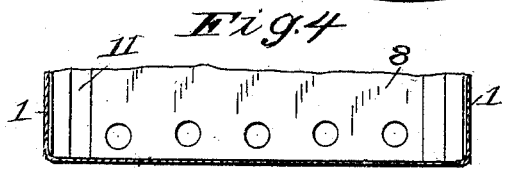
Witnesses.
Inventor.
by Otto C. Berchtold
J. B. Fay
Attorney.

UNITED STATES PATENT OFFICE.

OTTO C. BERCHTOLD, OF LAKEWOOD, OHIO.

KITCHEN UTENSIL.

976,979. Specification of Letters Patent. Patented Nov. 29, 1910.

Application filed January 8, 1910. Serial No. 536,985.

*To all whom it may concern:*

Be it known that I, OTTO C. BERCHTOLD, a citizen of the United States, and a resident of Lakewood, county of Cuyahoga, and State of Ohio, have invented a new and useful Improvement in Kitchen Utensils, of which the following is a specification, the principle of the invention being herein explained and the best mode in which I have contemplated applying that principle, so as to distinguish it from other inventions.

The present invention, relating as indicated to kitchen utensils, has as its object the provision of a utensil or device for use in separating fat, grease or oils from soups, gravies or other liquid mixtures such as is frequently desirable in culinary preparations, whether in the hostelry, home, or hospital. At the same time it is contemplated that other fields of use may be found for apparatus embodying the same principle of construction as that exemplified in the specific utensil herein illustrated.

To the accomplishment of the above and related objects, then, said invention consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—Figure 1 is a transverse vertical section of a kitchen utensil embodying my improved construction; Fig. 2 is a horizontal section of the same on the line 2—2, Fig. 1; Fig. 3 is a broken transverse vertical section at right angles to that of Fig. 1 and on a plane indicated by the line 3—3 on Fig. 2; and Fig. 4 is a view similar to Fig. 3, but illustrating a modification in construction.

The device, as illustrated, is designed to be manually used or lifted about, and to this end consists simply of a receptacle 1, preferably of metal, that is provided at one side with a handle 2 and opposite thereto with a spout 3 from which the contents of the receptacle may be discharged when desired, in a fashion presently to be described. Having regard primarily to the culinary service for which the device is specifically designed, such receptacle is provided with a removable cover 4 having an opening 5 surrounded by a funnel 6 in order to facilitate the pouring of liquids into the receptacle. A strainer 7 of any suitable construction is interposed in opening to prevent such material from entering into the receptacle.

The interior of the receptacle then is divided into two chambers of unequal size by a transverse partition 8 located opposite, and closely adjacent, to the opening 9 whereby the spout communicates with such receptacle's interior. Such opening 9 is desirably located near the bottom of the receptacle and an opening 10, likewise near the bottom, is provided in the partition, the latter opening being preferably offset, or in other words, not alined with the one first named. In place of a single opening, a series of perforations or equivalent slots may, of course, be utilized in either case. The partition 8 is slidably held in guides 11 so that it may be removed when it is desired to cleanse the device.

Extending transversely across the larger chamber in the receptacle is a plate 12 that, as illustrated, is formed integrally with the partition 8 so as to be continuous therewith along the latter's upper edge. Such plate inclines downwardly from the line of its juncture with the partition, and its outer edge more or less closely approaches the corresponding portion of the receptacle wall but does not touch such wall. This plate, it will be obvious, lies directly beneath the opening 5 in the cover through which the liquid to be separated is admitted to the receptacle.

The method of using the utensil will be readily apparent from the foregoing description of its construction. The soup, gravy or other liquid mixture from which the oily constituent is to be separated, is poured into the receptacle, preferably through the strainer provided, as has been explained, to prevent solid matter from entering along with the liquid. Such liquid, as it enters the receptacle, is received upon the transversely disposed downwardly inclined plate 12, and is deflected thereby from a straight downward path and caused to flow more gently across such plate and down the latter's edge into the chamber beneath. The effect of this interruption of the liquid, it has been found, is to cause a substantially complete and perfect separation of the fatty or oily globules that may be mixed with the liquid, even where they are relatively minute, or the oil and liquid in other words, emulsified. When the desired quantity of the liquid has been thus poured into the receptacle, or when the latter is approximately filled, the clear liquid, free from any oily constituents, may be poured from the spout and such pouring continued until practically the entire body of such liquid has been abstracted, leaving behind nothing but the fatty or oily constituents which may thus likewise be preserved in separate form. The separation takes place immediately so that the housewife or cook is relieved from the tedium of waiting for a gravy or soup to settle in order that the fat may be skimmed off.

It is not thought necessary to describe in detail the various other, possibly more extensive uses, to which the device in enlarged form may be put, since the principle of the invention should fully appear from the specific form of device herein set forth.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of a receptacle, an apertured partition dividing said receptacle into two chambers, said receptacle being provided with an inlet into one of said chambers and with an outlet from the other of said chambers, and a baffle plate disposed below said inlet.

2. In a device of the character described, the combination of a receptacle, a partition dividing said receptacle into two chambers and having an aperture near the bottom of the receptacle, said receptacle being provided with an inlet into one of said chambers and with an outlet from the other of said chambers, and a baffle plate disposed below said inlet.

3. In a device of the character described, the combination of a receptacle, a partition dividing said receptacle into a receiving and a discharging chamber and said partition having an aperture near the bottom of the receptacle, and a transverse plate in the upper portion of the receiving chamber, such plate inclining downwardly into the receiving chamber from such partition.

4. In a device of the character described, the combination of a receptacle, a partition dividing said receptacle into a receiving and a discharging chamber and said partition having an aperture near the bottom of the receptacle, and a transverse plate entirely within the upper portion of the receiving chamber, said plate inclining downwardly from and wholly supported by said partition.

5. In a device of the character described, the combination of a receptacle, a partition removably held in said receptacle and dividing the same into two chambers and said partition having an aperture near the bottom of the receptacle, said receptacle being provided with an inlet opening into one of said chambers and with an outlet from the other of said chambers, and a baffle plate disposed below said inlet.

Signed by me this 5th day of January, 1910.

OTTO C. BERCHTOLD.

Attested by—
ANNA L. GILL,
JNO. F. OBERLIN.